United States Patent
Baumgart et al.

(10) Patent No.: US 7,605,996 B2
(45) Date of Patent: Oct. 20, 2009

(54) METHOD AND SYSTEM FOR DETECTING A CHANGE IN A ROTATIONAL VELOCITY OF A MAGNETIC DISK OR A SPINDLE COUPLED TO THE MAGNETIC DISK

(75) Inventors: Peter Michael Baumgart, San Jose, CA (US); Charles Raymond Davis, San Jose, CA (US); Gary Allan Herbst, San Jose, CA (US); Bernhard E. Knigge, San Jose, CA (US); Charles Mathew Mate, San Jose, CA (US); Bruce Alexander Wilson, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/965,980

(22) Filed: Dec. 28, 2007

(65) Prior Publication Data

US 2009/0168221 A1    Jul. 2, 2009

(51) Int. Cl.
  G11B 21/02  (2006.01)
  G11B 15/46  (2006.01)
(52) U.S. Cl. .................................. 360/75; 360/73.03
(58) Field of Classification Search ................. None
  See application file for complete search history.

(56) References Cited

U.S. PATENT DOCUMENTS

| | | | |
|---|---|---|---|
| 5,594,595 A | 1/1997 | Zhu | 360/31 |
| 6,198,590 B1 | 3/2001 | Codilian et al. | 360/73.03 |
| 6,288,856 B1 | 9/2001 | Ottesen et al. | 360/31 |
| 6,678,102 B1 | 1/2004 | Liikanen et al. | 360/31 |
| 6,680,806 B2 | 1/2004 | Smith | 360/31 |
| 6,700,724 B2 | 3/2004 | Riddering et al. | 360/69 |
| 6,762,899 B2 | 7/2004 | Ottesen et al. | 360/75 |
| 6,967,805 B1 | 11/2005 | Hanchi et al. | 360/75 |
| 7,068,458 B2 | 6/2006 | Huang et al. | 360/75 |
| 7,088,545 B1 | 8/2006 | Singh et al. | 360/75 |
| 7,180,692 B1 | 2/2007 | Che et al. | 360/31 |
| 7,215,495 B1 | 5/2007 | Che et al. | 360/31 |
| 7,224,548 B1 | 5/2007 | Emo | 360/78.04 |
| 7,271,975 B2 | 9/2007 | Shimizu et al. | 360/75 |
| 7,289,288 B1 * | 10/2007 | Tu | 360/73.03 |
| 7,362,534 B1 * | 4/2008 | Schreck et al. | 360/75 |
| 7,423,830 B2 * | 9/2008 | Ma et al. | 360/75 |
| 2006/0203376 A1 | 9/2006 | Yoshioka et al. | 360/75 |
| 2006/0238912 A1 | 10/2006 | Kumano | 360/75 |

(Continued)

OTHER PUBLICATIONS

Khurshudov et al., "Head-Disk Contact Detection In The Hard Disk Drives", *Wear*, vol. 255, Issues 7-12, (Aug.-Sep. 2003), pp. 1314-1322. (abstract only).

*Primary Examiner*—Andrew L Sniezek
(74) *Attorney, Agent, or Firm*—Zilka-Kotab, PC (57) ABSTRACT

A method according to one embodiment comprises detecting a change in a rotational velocity of a magnetic disk or a spindle coupled to the magnetic disk, the change being caused by head-disk contact. A method for detecting head-disk contact according to another embodiment comprises measuring a rotational velocity of a magnetic disk or a spindle coupled to the magnetic disk; detecting a change in the rotational velocity, the change being caused by head-disk contact; and correlating the change in rotational velocity with the head-disk contact.

21 Claims, 9 Drawing Sheets

U.S. PATENT DOCUMENTS

2007/0053104 A1 3/2007 Satoh et al. .................. 360/128
2007/0127147 A1 6/2007 Yokohata et al. .............. 360/31
2007/0230018 A1 10/2007 Schreck et al. ................ 360/75

* cited by examiner

METHOD AND SYSTEM FOR DETECTING A CHANGE IN A ROTATIONAL VELOCITY OF A MAGNETIC DISK OR A SPINDLE COUPLED TO THE MAGNETIC DISK

FIELD OF THE INVENTION

The present invention relates to data storage systems, and more particularly, this invention relates to detecting changes in rotational velocities of magnetic disks.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

SUMMARY OF THE INVENTION

A method according to one embodiment comprises detecting a change in a rotational velocity of a magnetic disk or a spindle coupled to the magnetic disk, the change being caused by head-disk contact.

A method for detecting head-disk contact according to another embodiment comprises measuring a rotational velocity of a magnetic disk or a spindle coupled to the magnetic disk; detecting a change in the rotational velocity, the change being caused by head-disk contact; and correlating the change in rotational velocity with the head-disk contact.

A method for setting a head-disk clearance spacing according to another embodiment comprises inducing a head-disk contact; detecting a change in a rotational velocity of a magnetic disk or a spindle coupled to the magnetic disk, the change being caused by the head-disk contact; and determining a condition to avoid prolonged head-disk contact.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of disk-based storage systems and/or related diagnostic systems and methods, as well as operation and/or component parts thereof In one general embodiment, a method includes detecting a change in a rotational velocity of a magnetic disk or a spindle coupled to the magnetic disk, the change being caused by head-disk contact.

In another general embodiment, a method for detecting head-disk contact is provided. In operation, a rotational velocity of a magnetic disk or a spindle coupled to the magnetic disk is measured. Additionally, a change in the rotational velocity is detected, the change being caused by head-disk contact. Furthermore, the change in rotational velocity is correlated with the head-disk contact.

In still another general embodiment, a method for setting a head-disk clearance spacing is provided. In operation, a drive parameter is changed that reduces head-disk spacing until contact is induced. The onset of this contact is detected by detecting a change in a rotational velocity of a magnetic disk or a spindle coupled to the magnetic disk. The parameter is then backed off increasing the head-disk spacing to the specified clearance.

Figure 1:
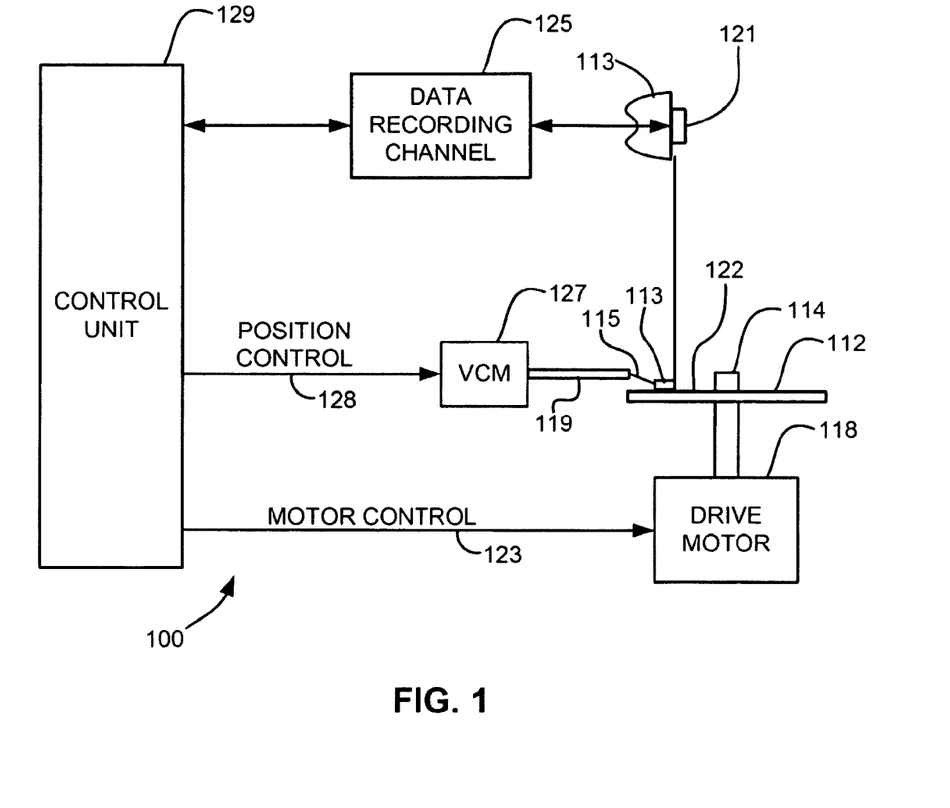
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the disk 112.

At least one slider 113 is positioned near the disk 112, each slider 113 supporting one or more magnetic read/write heads 121. As the disks rotate, slider 11.3 is moved radically in and out over disk surface 1.22 so that heads 121 may access different tracks of the disk where desired data are recorded. Each slider 113 is attached to an actuator arm 119 by means of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Figure 2:
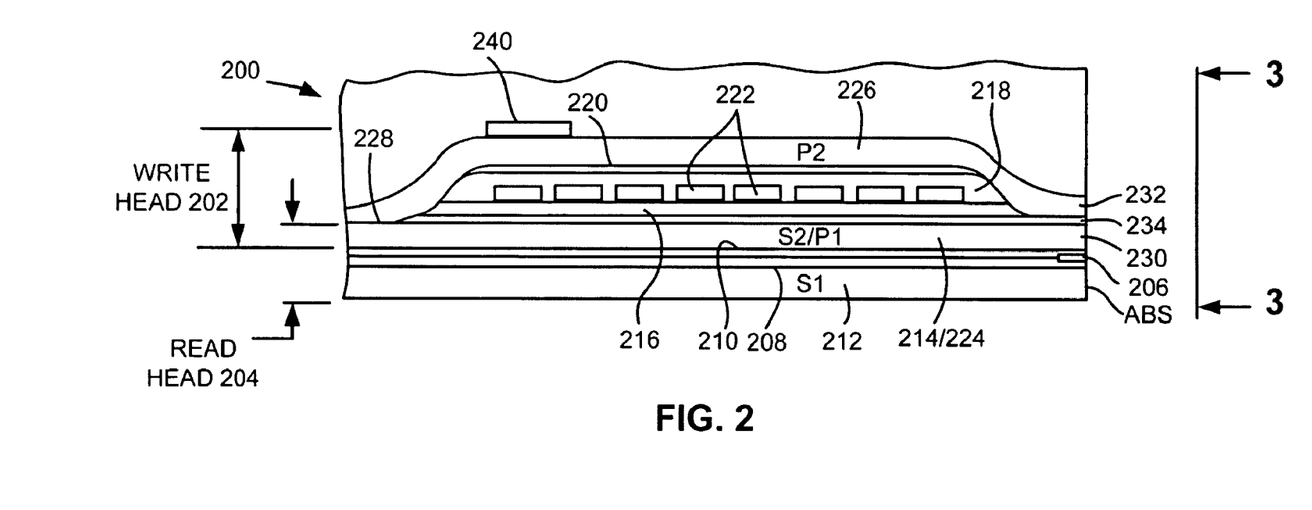
FIG. 2 is a partial view of the slider and a merged magnetic head.
Figure 3:
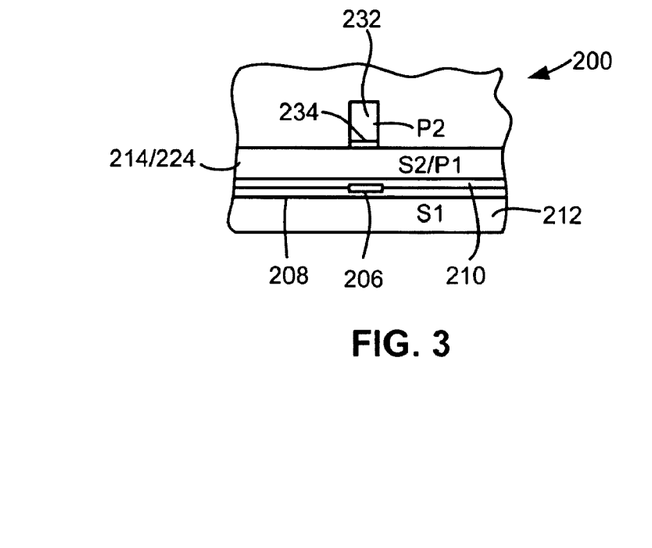
FIG. 3 is a partial ABS view, not to scale, of the slider taken along plane 3-3 of FIG. 2.

FIG. 2 is a side cross-sectional elevation view of an illustrative merged magnetic head 200, which includes a write head portion 202 and a read head portion 204, the read head portion employing a spin valve sensor 206. FIG. 3 is an ABS view of FIG. 2. The spin valve sensor 206 is sandwiched between nonmagnetic electrically insulative first and second read gap layers 208 and 210, and the read gap layers are sandwiched between ferromagnetic first and second shield layers 212 and 214. In response to external magnetic fields, the resistance of the spin valve sensor 206 changes. A sense current ($I_s$) conducted through the sensor causes these resistance changes to be manifested as potential changes. These potential changes may then be processed as readback signals by processing circuitry (e.g. processing circuitry of the control unit 129 shown in FIG. 1).

The write head portion 202 of the magnetic head 200 includes a coil layer 222 sandwiched between first and second insulation layers 216 and 218. A third insulation layer 220 may be employed for planarizing the head to eliminate ripples in the second insulation layer caused by the coil layer 222. The first, second and third insulation layers are referred to in the art as an "insulation stack".

The coil layer 222 and the first, second and third insulation layers 216, 218 and 220 are sandwiched between first and second pole piece layers 224 and 226. The first and second pole piece layers 224 and 226 are magnetically coupled at a back gap 228 and have first and second pole tips 230 and 232 which are separated by a write gap layer 234 at the ABS. Since the second shield layer 214 and the first pole piece layer 224 are a common layer this head is known as a merged head. In a piggyback head, an insulation layer is located between a second shield layer and a first pole piece layer. First and second solder connections (not shown) connect leads (not shown) from the spin valve sensor 206 to leads (not shown) on the slider 113 (FIG. 1), and third and fourth solder connections (not shown) connect leads (not shown) from the coil 222 to leads (not shown) on the suspension. A heater 240 may be present to induce protrusion, as discussed immediately below. The position of the heater 240 is not narrowly critical, and will vary based on design parameters such as where the protrusion is desired, coefficients of thermal expansion of the surrounding layers, etc.

As alluded to above, recent slider head designs have a small heater next to the read/write elements. See also, M. Suk, K. Miyake, M. Kurita, H. Tanaka, S. Saegusa, and N. Robertson, "Verification of thermally induced nanometer actuation of magnetic recording transducer to overcome mechanical and magnetic spacing challenges," *IEEE Transactions on Magnetics,* vol. 41, pp. 4350-4352, November 2005. If an electric current is applied to this heater, the region around the heater thermally expands leading to reduced head-disk spacing. This is often referred to as Thermal Fly-height Control (TFC). To accurately control the head to disk clearance, one needs to calibrate the necessary power required for each head to fly at a certain spacing. This can be done by increasing the power to the TFC heater until head-disk contact is initiated, noting the necessary heating power for contact, and then reducing the power to achieve the desired clearance. This TFC protrusion calibration may require a series of brief head-disk contacts either during the manufacture of the disk drive or during disk drive operations. This contact usually leads to slider bouncing vibrations, which underlie some contact detection methods such as those described in U.S. Pat. Nos. 7,224,548, 5,594, 595, and 7,215,495, and US Patent Application Pub. No. 2007/0127147A1, which are herein incorporated by reference insofar as the terminology therein is consistent with this disclosure. However, some slider designs show very little or no bounce under some contact conditions. Hence, a more universal approach to contact detection may be beneficial in some instances.

Figure 4:
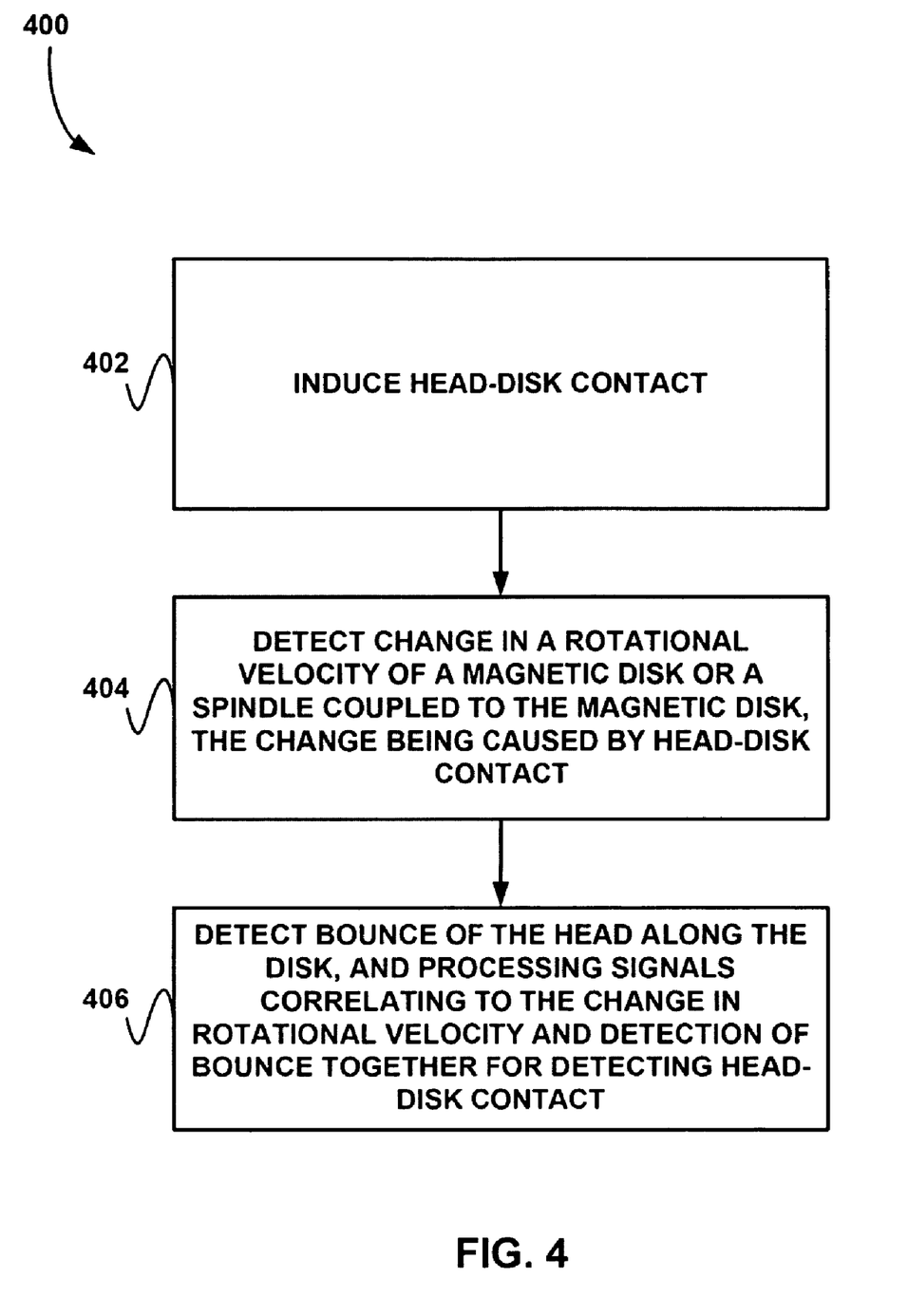
FIG. 4 shows a method for detecting a change in a rotational velocity of a magnetic disk or a spindle coupled to the magnetic disk, in accordance with one embodiment.

FIG. 4 shows a method 400 for detecting a change in a rotational velocity of a magnetic disk or a spindle coupled to the magnetic disk, in accordance with one embodiment. As an option, the present method 400 may be implemented in the context of the functionality and architecture of FIGS. 1-3. Of course, however, the method 400 may be carried out in any desired environment. It should also be noted that the aforementioned definitions may apply during the present description.

As shown, in operation 402, head-disk contact is induced. In one embodiment, the head-disk contact may be induced by heating the head. In another embodiment, the head-disk contact may be induced by rotating the magnetic disk at a rotational velocity below a velocity required to maintain a constant separation of the head and disk. For example, such separation may be accomplished by creating an air bearing between the head and the disk caused by rotation of the disk. Accordingly, the head-disk contact may be induced by removing the air bearing.

A change in a rotational velocity of a magnetic disk or a spindle coupled to the magnetic disk is detected, the change being caused by head-disk contact. See operation 404 Detecting the change in the rotational velocity may be accomplished in a variety of ways. For example, detecting the change in the rotational velocity may include detecting a deceleration of the spindle or the magnetic disk coupled to the spindle. As another example, detecting the change in the rotational velocity may include measuring a change in current applied to a motor driving the spindle to maintain about a constant rotational velocity thereof. As yet another example, detecting the change in the rotational velocity may include measuring a change in frequency of an alternating current applied to a motor driving the spindle. Still yet, detecting the change in the rotational velocity may include measuring changes in time intervals between servo sector readings.

As another option, the method 400 may further include detecting bounce of the head along the disk, and processing signals correlating to the change in rotational velocity and detection of bounce together for detecting head-disk contact. See operation 406. It should be noted that, although the method 400 is illustrated in FIG. 4 as including operation 406, this operation is optional and should not be construed as limiting in any manner.

Additionally, in one embodiment, the method 400 may be implemented and configured for detecting head-disk contact. For example, the rotational velocity of a magnetic disk or a spindle coupled to the magnetic disk may be measured. Additionally, a change in the rotational velocity may be detected, the change being caused by head-disk contact. In this case, the change in rotational velocity may be correlated with the head-disk contact.

Figure 5:
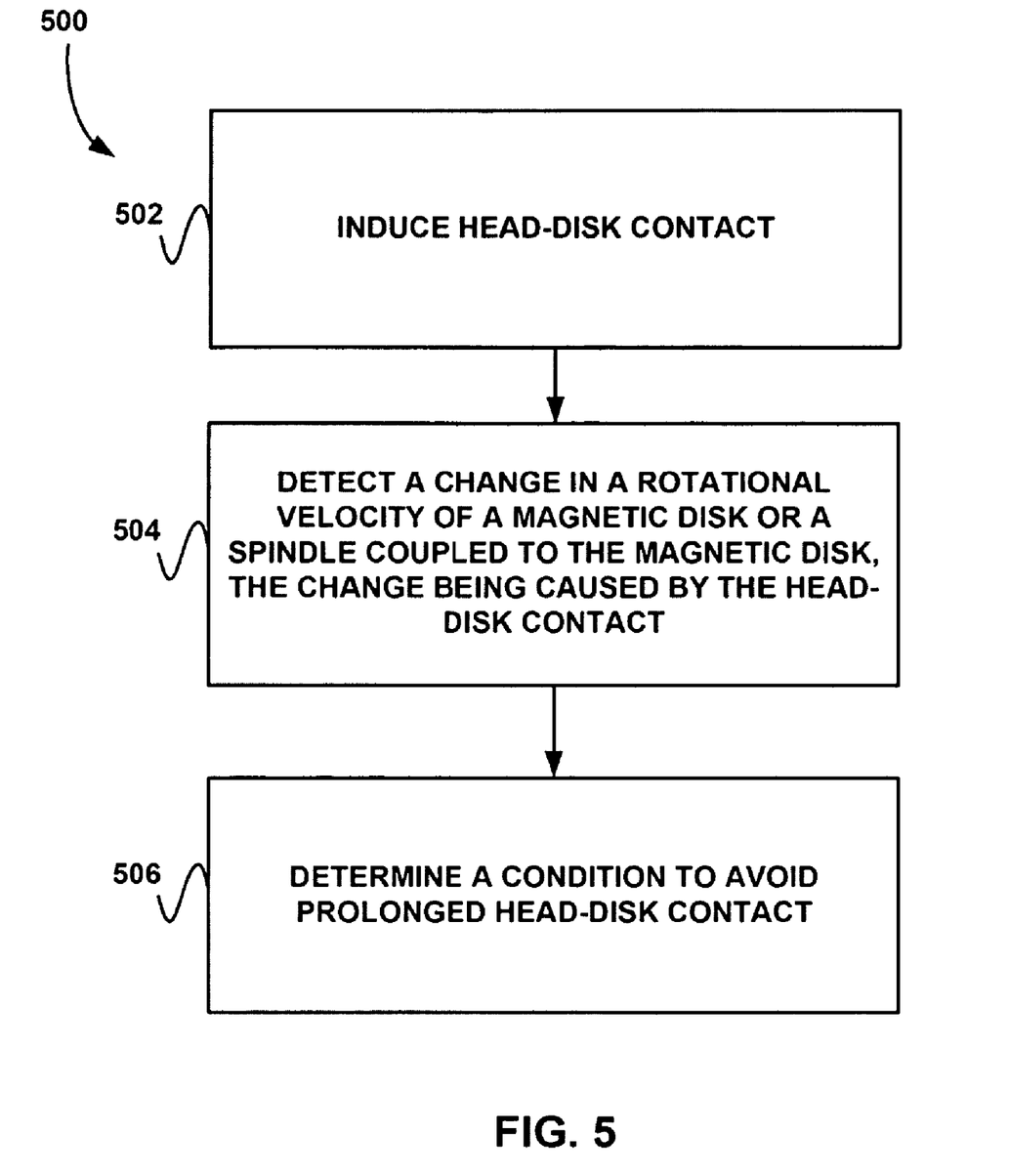
FIG. 5 shows a method for setting a head-disk clearance spacing, in accordance with one embodiment.

FIG. 5 shows a method 500 for setting a head-disk clearance spacing, in accordance with one embodiment. As an option, the present method 500 may be implemented in the context of the functionality and architecture of FIGS. 1-4. Of course, however, the method 500 may be carried out in any desired environment. It should also be noted that the aforementioned definitions may apply during the present description.

As shown, a head-disk contact is induced. See operation 502. Additionally, a change in a rotational velocity of a magnetic disk or a spindle coupled to the magnetic disk is detected, the change being caused by the head-disk contact. See operation 504.

Furthermore, a condition to avoid prolonged head-disk contact is determined. See operation 506. In other words, some head-disk contact may be inevitable due to such things as externally applied vibrations, asperities on the disk, jarring the drive (e.g. as in a dropped laptop), etc. One goal may be to avoid such head-disk contact as much as possible. Accordingly, in some embodiments, prolonged head-disk contact may be defined as greater than about 0.01% head-disk contact time relative to total time drive is in use, greater than about 0.1% head-disk contact time relative to total in use time, greater than about 1% head-disk contact time relative to total in use time, greater than about 2% head-disk contact time relative to total in use time, greater than about 5% head-disk contact time relative to total in use time, greater than about 10% head-disk contact time relative to total in use time, greater than about 50% head-disk contact time relative to total in use time, etc.

In various embodiments, the condition to avoid may include, but is not limited to, an amount of thermally induced protrusion of the head, a rotational velocity of the disk relative to the head, etc. Furthermore, such condition could also take into account such things as radial position of the head relative to the disk, etc. As an option, the condition may be logged in a database or stored in memory.

In one embodiment, determining the condition to avoid prolonged head-disk contact may include determining a condition to achieve a desired head-disk clearance spacing. In some cases, this may be the design clearance spacing, which may be set by adjusting thermal protrusion, adjusting a rotational velocity of the disk to affect the air bearing, etc. As an option, the method 500 may be performed at two or more different radial positions relative to the disk.

Figure 6:
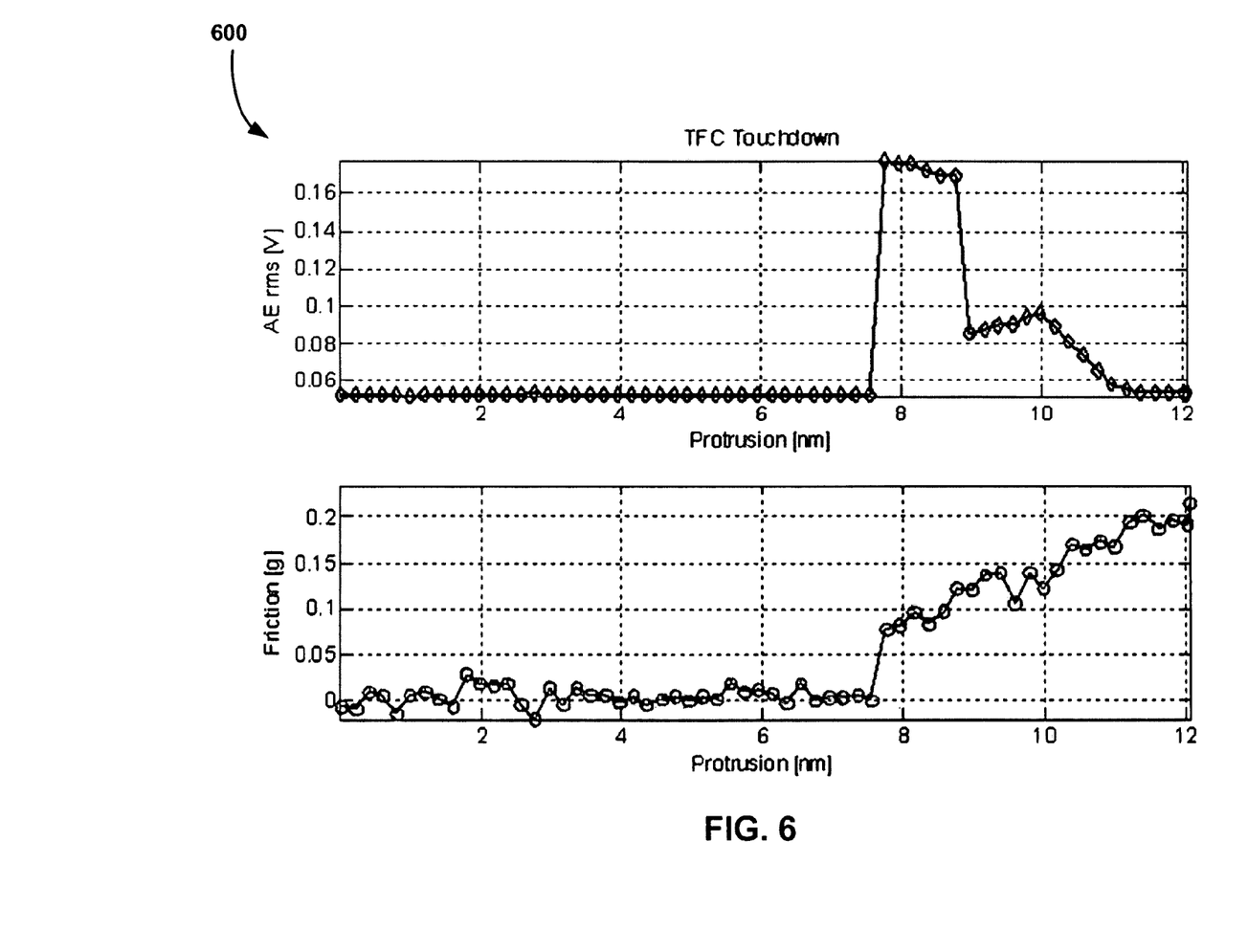
FIG. 6 shows plots illustrating how a signal based on slider bounce may go to zero when smooth sliding occurs, in accordance with one embodiment.

FIG. 6 shows plots 600 illustrating how a signal based on slider bounce, such as acoustic emission (AE) or Laser Doppler Vibrometry (LDV), may go to zero when smooth sliding occurs, while signals that rely on friction are more likely to be a reliable indicator of contact, in accordance with one embodiment. In FIG. 6, the top curve shows bouncing (high AE) for thermal fly-height control (TFC) protrusion between 7.6 and 11 nm, but smooth, low bounce sliding above 11 nm protrusion, while the bottom curve shows friction monotonically increases with an increasing level of interference above 7.6 nm TFC protrusion.

In the context of the present description, protrusion refers to the physical distance that the read/write elements extend towards the disk surface relative to their initial position at some reference or nominal temperature. TFC refers to a technique involving imbedding a separate heating element into a head structure where the separate heater structure enables the control of the read/write element protrusion independently from effects generated by the read/write elements during read or write operations.

In one embodiment, a method is provided for reliably measuring friction from TFC induced contact by measuring the deceleration of the spindle motor and disk stack. When a recording head is thermally protruded into contact with a disk, the deceleration of the spindle motor and disk stack may be measured several ways. In one embodiment, the delta of the root mean square (RMS) current that needs to be provided to the spindle motor after contact to return the rotation speed to the original value may be measured.

For example, when heads in a disk drive fly without making contact, an RMS current $I_0$ and voltage $V_0$ may be provided to the spindle motor so that the power $P_0=I_0V_0$ equals the power dissipated by the motor. When a head is thermally protruded such that it makes contact, the spindle may begin to decelerate due to the friction force F. Eventually, the spindle servo may increase the spindle current by the amount $\Delta I$ such that the rotation speed returns to its original value.

Figure 7:
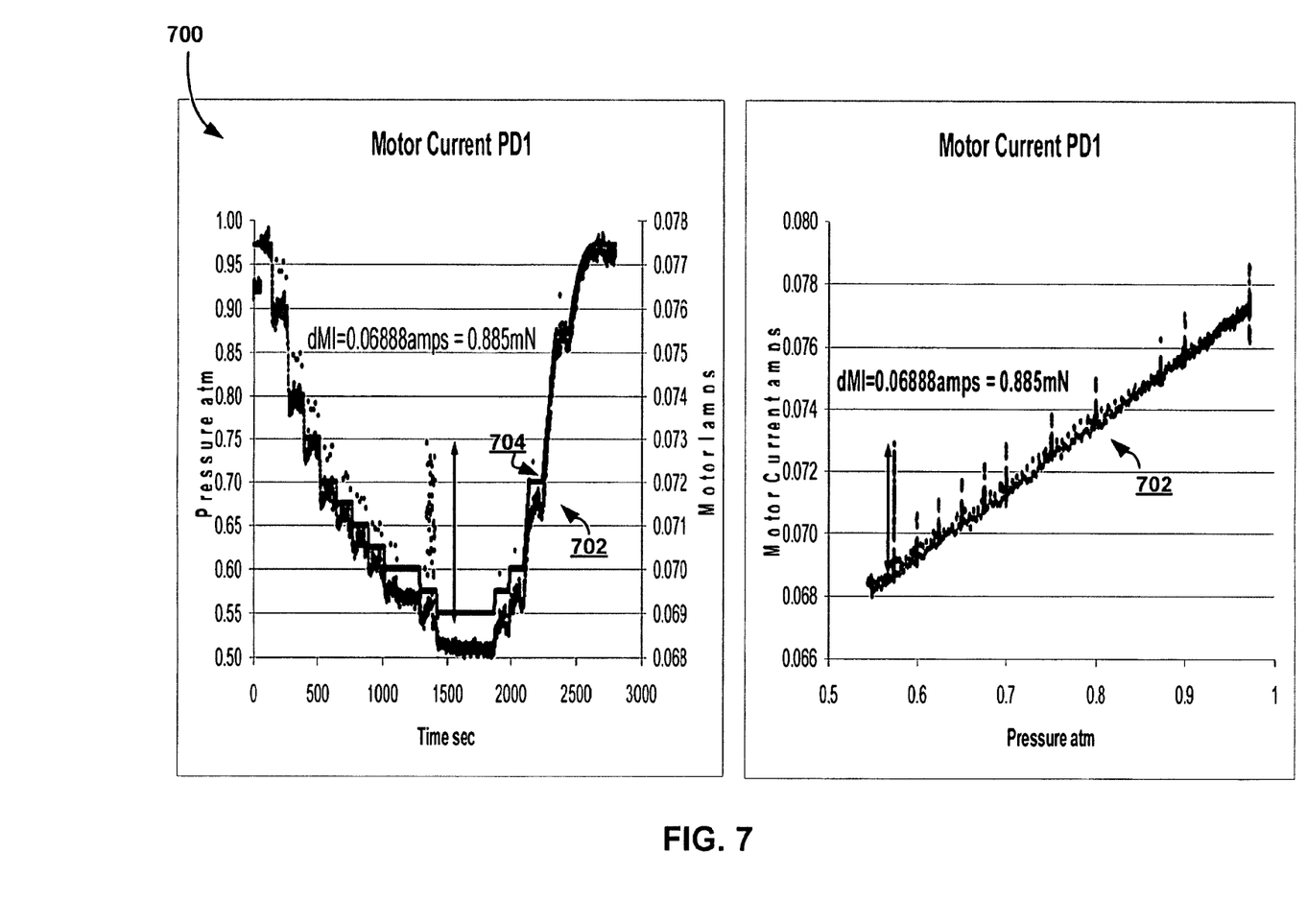
FIG. 7 shows examples of how spindle current increases when a head in a mobile drive is protruded into contact using write protrusion, in accordance with one embodiment.

FIG. 7 shows examples of how the spindle current increases when a head in a mobile drive is protruded into contact using write protrusion, in accordance with one embodiment. The extra power $\Delta IV_0$ needed to keep the spindle speed constant equals the power dissipated by the friction contact $Fv$, where $v$ is the disk speed at the radius where contact occurs and F is the friction force. Thus, the friction force, which corresponds to the degree of contact, may be determined from $F=\Delta IV_0/v$.

Referring to FIG. 7, there is shown a plot 700 illustrating RMS spindle motor current 702 and ambient pressure 704 for a specific drive while individual heads are being protruded by passing a current through the write coil as the air pressure in the drive is pumped down to reduce the head-disk clearance, until contact occurs for the individual heads (at the time of 1400 seconds or a pressure of 0.57 atm in plot 700); then the drive is brought back up in pressure, in accordance with one embodiment. As shown, when contact occurs, the current increases by an amount $\Delta I=0.069$ amps, which corresponds to a friction force of 0.89 mN.

In another embodiment, the deltas of the time intervals between the zero crossing points of the alternating current (AC) spindle motor current may be measured. in some cases, the time constant of the spindle servo may be relatively slow when using spindle motor current for detecting contact, typically about 1 second. Thus, the head may have to remain in contact for over a second in order to detect contact.

In certain cases, a faster way of detecting contact may be to use the time intervals between the zero crossings of the motor current to measure the spindle speed, where the deceleration is simply the time derivative of this signal. In this case, the deceleration may be provided over one revolution. As an option, in order to achieve a less noisy value for deceleration, this signal may be averaged over several revolutions, so long as the averaging time is kept shorter than the spindle servo response time.

Figure 8:
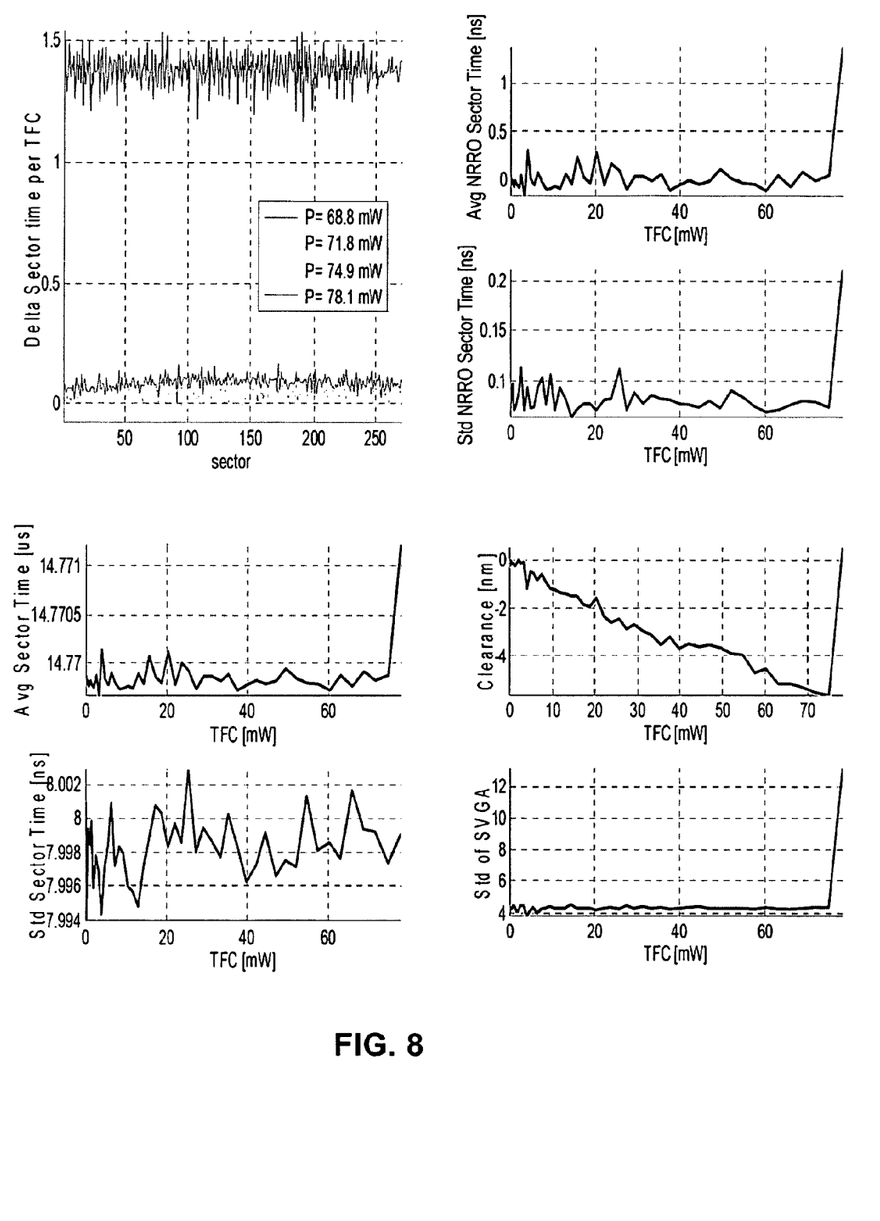
FIG. 8 shows an example where sector time is measured a few milliseconds after the onset of thermal fly-height (TFC) protrusions, in accordance with one embodiment.

In still another embodiment, the deltas of the time intervals between the servo sectors on the disk may be measured to determine deceleration. For example, a channel clock, which is very accurate and has a time resolution down to tens of picoseconds, may be utilized to monitor sector to sector variations in timing. FIG. 8 shows an example where the sector time is measured a few milliseconds after the onset of TFC protrusions, in accordance with one embodiment. As shown in the middle left-hand plot of FIG. 8, when contact occurs at a TFC power of 78.1 mW, the delta sector time increases by about 1.5 ns and the standard deviation is also increasing.

In one embodiment, using the channel clock may allow for a time resolution of less than 10 ps. In another embodiment, a faster servo clock may be utilized to measure sector to sector variations in timing. As shown, the right-hand plots of FIG. 8 illustrate sector timing variations due to TFC contact in comparison to the SVGA method where the slider head bouncing is determined from the modulation of the read back signal determined by using the servo variable gain amplifier.

Figure 9:
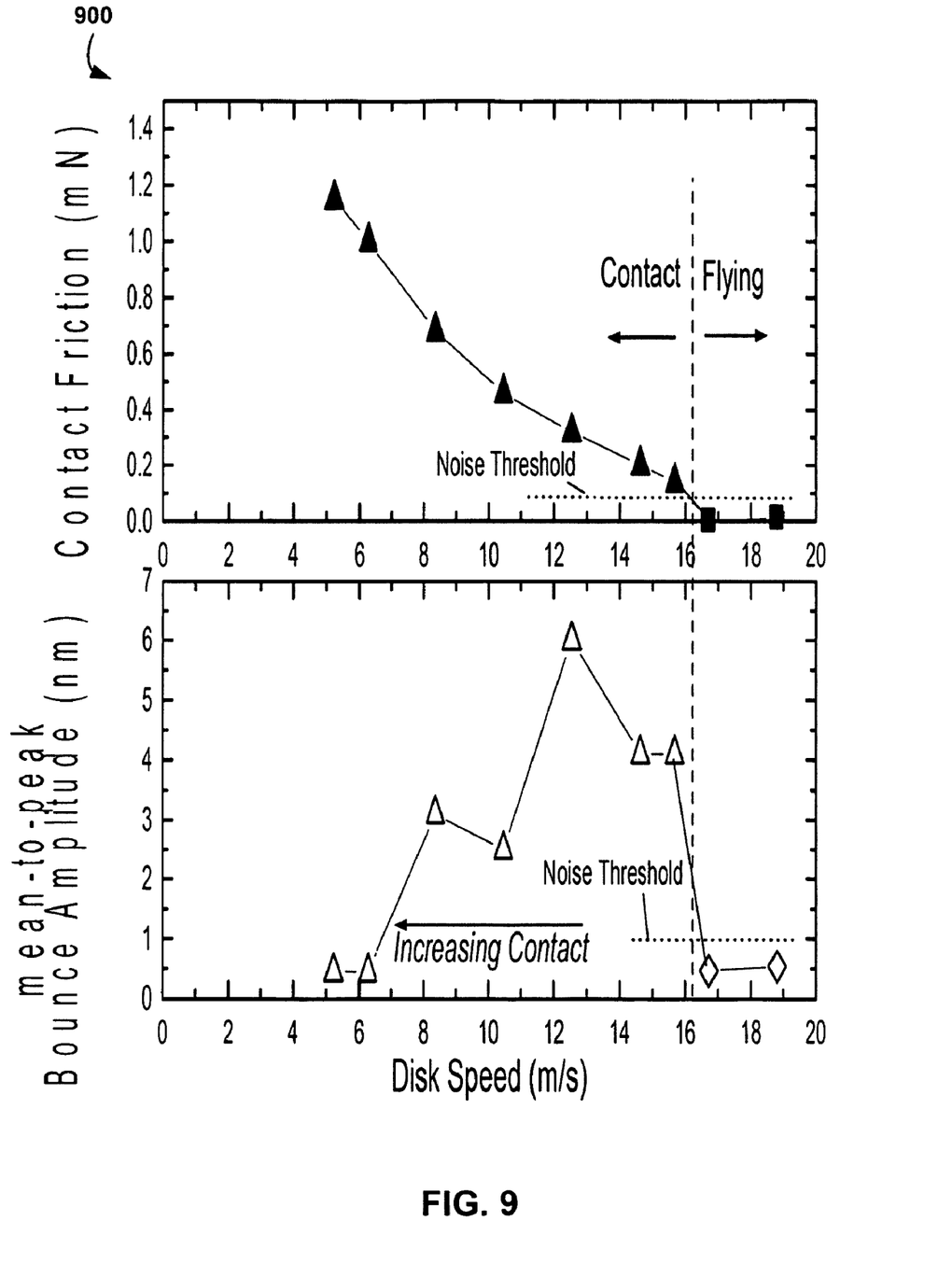
FIG. 9 shows a plot illustrating friction and mean-to-peak bounce measured on a spinstand for a touchpad slider that is brought into increasing contact by reducing disk speed, in accordance with one embodiment.

In some cases, friction and bounce may be coupled signals such that the more the bounce the lower the friction and the lower the bounce the higher the friction. FIGS. 6 and 9 show how, after the initial contact, the bounce signal (such as AE or SVGA) can decrease with increasing contact while the friction increases. Thus, while bounce may be a good indicator for light contact of many head-disk interfaces, bounce may become a poor indicator at high contacts where the bounce signal drops below the noise threshold for the detection method.

One way to take advantage of the coupling between friction and bounce is to improve the sensitivity of contact detection by using a combination of the friction and bounce signals to detect contact. FIG. 9 shows a plot 900 illustrating friction and mean-to-peak bounce measured on a spinstand for a slider with a small protruding pad that is brought into increasing contact by reducing disk speed, in accordance with one embodiment. in this case, the air-bearing surface (ABS) of the slider has a flying height that varies linearly with disk speed at the rate of 1 nm/(m/s).

Figure 10:
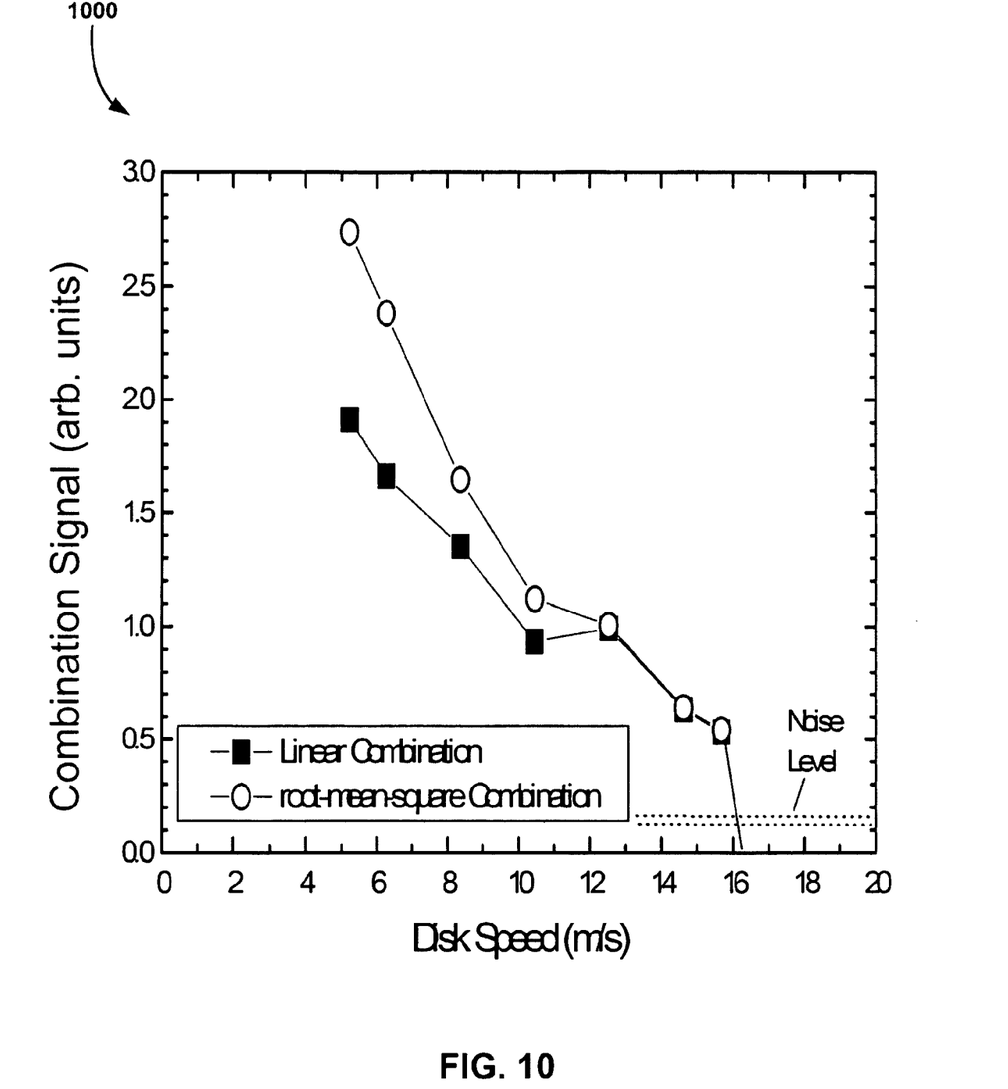
FIG. 10 shows a plot illustrating combinations of the friction and bounce signals in the plot shown in FIG. 9.

FIG. 10 shows a plot 1000 illustrating several combinations of the friction and bounce signals in the plot 900 shown in FIG. 9. In this example, the "linear" signal of the plot 900 is calculated using Equation 1, shown below.

$$a*Friction + b*Bounce \quad \text{Equation 1}$$

In this case, a and b are chosen such that the combined signal at 12 m/s is 50% friction and 50% bounce with a value of 1. Additionally, the "root-mean-square" signal in the plot 1000 is calculated using Equation 2 shown below.

$$\sqrt{a*Friction^2 + b*Bounce^2} \quad \text{Equation 2}$$

With respect to Equation 2, a and b are chosen such that the combined signal at 12 m/s is 50% friction and 50% bounce and has the value of 1. In this case, the combined signals have an advantage for detecting contact over the bounce signal alone because they are above the noise level for all levels of contact. In addition, the combined signals have an advantage over the friction signal alone because they are much higher over the noise threshold than the friction signal.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    detecting a change in a rotational velocity of a magnetic disk or a spindle coupled to the magnetic disk, the change being caused by head-disk contact,
    wherein detecting the change in the rotational velocity includes measuring a change in a current applied to a motor driving the spindle to maintain about a constant rotational velocity thereof,
    wherein detecting the change in the rotational velocity includes measuring a change in frequency of an alternating current applied to a motor driving the spindle to maintain about a constant rotational velocity thereof.

2. A method as recited in claim 1, wherein a change in the rotational velocity of the spindle is detected.

3. A method as recited in claim 1, further comprising inducing the head-disk contact, wherein the head-disk contact is induced by heating the head.

4. A method as recited in claim 1, further comprising inducing the head-disk contact, wherein the head-disk contact is induced by rotating the magnetic disk at a rotational velocity below a velocity required to maintain a constant separation of the head and disk.

5. A method as recited in claim 1, wherein detecting the change in the rotational velocity includes detecting a deceleration of the spindle or the magnetic disk coupled to the spindle.

6. A method as recited in claim 1, wherein detecting the change in the rotational velocity includes measuring changes in time intervals between servo sector readings.

7. A method, comprising:
    detecting a change in a rotational velocity of a magnetic disk or a spindle coupled to the magnetic disk, the change being caused by head-disk contact; and
    detecting bounce of the head along the disk, and processing signals correlating to the change in rotational velocity and detection of bounce together for detecting head-disk contact,
    wherein detecting the change in the rotational velocity includes measuring a change in a current applied to a motor driving the spindle to maintain about a constant rotational velocity thereof.

8. A method as recited in claim 7, wherein detecting the change in the rotational velocity includes measuring a change in frequency of an alternating current applied to a motor driving the spindle to maintain about a constant rotational velocity thereof.

9. A method for detecting head-disk contact, comprising:
    measuring a rotational velocity of a magnetic disk or a spindle coupled to the magnetic disk;
    detecting a change in the rotational velocity, the change being caused by head-disk contact;

detecting bounce of the head along the disk, and processing signals correlating to the change in rotational velocity and detection of bounce together for detecting head-disk contact; and correlating the change in rotational velocity with the head-disk contact.

10. A method as recited in claim 9, wherein the rotational velocity of the spindle is measured.

11. A method as recited in claim 9, further comprising inducing the head-disk contact, wherein the head-disk contact is induced by heating the head.

12. A method as recited in claim 9, further comprising inducing the head-disk contact, wherein the head-disk contact is induced by rotating the magnetic disk at a rotational velocity below a velocity required to maintain a constant separation of the head and disk.

13. A method as recited in claim 9, wherein detecting the change in the rotational velocity includes detecting a deceleration of the spindle or the magnetic disk coupled to the spindle.

14. A method as recited in claim 9, wherein detecting the change in the rotational velocity includes measuring a change in current applied to a motor driving the spindle to maintain about a constant rotational velocity thereof.

15. A method as recited in claim 9, wherein detecting the change in the rotational velocity includes measuring a change in frequency of an alternating current applied to a motor driving the spindle to maintain about a constant rotational velocity thereof.

16. A method as recited in claim 9, wherein detecting the change in the rotational velocity includes measuring changes in time intervals between servo sector readings.

17. A method for setting a head-disk clearance spacing, the method comprising:

inducing a head-disk contact;

measuring a rotational velocity of a magnetic disk or a spindle coupled to the magnetic disk;

detecting a change in a rotational velocity of a magnetic disk or a spindle coupled to the magnetic disk, the change being caused by the head-disk contact;

detecting bounce of the head along the disk, and processing signals correlating to the change in rotational velocity and detection of bounce together for detecting the head-disk contact; and determining a condition to avoid prolonged head-disk contact;

wherein the condition includes a rotational velocity of the disk relative to the head.

18. A method as recited in claim 17, wherein determining the condition to avoid prolonged head-disk contact includes determining a condition to achieve a desired head-disk clearance spacing.

19. A method as recited in claim 17, wherein the condition includes an amount of thermally induced protrusion of the head.

20. A method as recited in claim 17, further comprising storing the condition in a table.

21. A method as recited in claim 17, further comprising performing the method at at least two different radial positions relative to the disk.

* * * * *